(12) United States Patent
Song et al.

(10) Patent No.: US 11,475,229 B2
(45) Date of Patent: Oct. 18, 2022

(54) COMPOSITE MATRIX CODE ARRAY

(71) Applicant: International Business Machines Corporation, Armonk, NY (US)

(72) Inventors: Tao Song, Shenzhen (CN); Zhongfeng Yang, Shenzhen (CN); XiYuan Yin, Guangzhou (CN); Qiuyi Yu, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/207,838

(22) Filed: Mar. 22, 2021

(65) Prior Publication Data
US 2022/0300726 A1 Sep. 22, 2022

(51) Int. Cl.
*G06K 7/14* (2006.01)
*G06T 7/00* (2017.01)

(52) U.S. Cl.
CPC .......... *G06K 7/1417* (2013.01); *G06K 7/1426* (2013.01); *G06K 7/1491* (2013.01); *G06T 7/0004* (2013.01)

(58) Field of Classification Search
CPC .. G06K 7/1417; G06K 7/1426; G06K 7/1491; G06K 7/0004; A61B 6/7495; G11B 20/0036; B81C 1/0046; B81C 1/00928; H01L 51/0019
See application file for complete search history.

(56) References Cited

U.S. PATENT DOCUMENTS

| | | | |
|---|---|---|---|
| 2015/0235069 A1* | 8/2015 | Kumar | G06K 19/06159 700/118 |
| 2016/0260001 A1* | 9/2016 | Flores | G06K 19/06037 |
| 2016/0307083 A1 | 10/2016 | Kumar et al. | |
| 2017/0280126 A1* | 9/2017 | Van der Auwera | G06T 3/0056 |
| 2018/0121775 A1 | 5/2018 | Sharma et al. | |

FOREIGN PATENT DOCUMENTS

| | | |
|---|---|---|
| CN | 104246794 A | 12/2014 |
| CN | 204856553 U | 12/2015 |
| CN | 111307043 A | 6/2020 |
| EP | 3242252 A1 | 11/2017 |

* cited by examiner

Primary Examiner — Matthew Mikels
(74) Attorney, Agent, or Firm — Peter J. Edwards

(57) ABSTRACT

A computer-readable code array comprises a first three-dimensional module and second three-dimensional module. The first three-dimensional module comprises a first face and a second face. A state of the first face encodes a pixel of a first computer-readable code. A state of the second face encodes a pixel of a second computer-readable code. The second three-dimensional module comprises a third face and a fourth face. A state of the third face encodes a second pixel of the first computer-readable code. A state of the second face encodes a second pixel of the second computer-readable code.

17 Claims, 8 Drawing Sheets

COMPOSITE MATRIX CODE ARRAY

BACKGROUND

The present invention relates to machine-readable information encoding, and more specifically, to bar codes and matrix codes.

Machine-readable encoding is used in various fields to record information that can be later read by a machine. For example, 1-dimensional bar codes and 2-dimensional matrix codes (sometimes also referred to as "bar codes") are typically placed on product packaging. These codes can identify the specific product for pricing, stocking, and auditing purposes. Codes can also be used to record information about a product's creation, such as methods of manufacturing, date of assembly, or the location of a factory in which a product was prepared.

SUMMARY

Some embodiments of the present disclosure can be illustrated as a computer-readable-code array. The code array may comprise a first three-dimensional array module. The first three-dimensional array module may comprise a first face. A state of the first face may encode a first pixel of a first computer-readable code. The first three-dimensional array module may also comprise a second face. A state of the second face may encode a second pixel of a second computer-readable code. The code array may also comprise a second three-dimensional array module. The second three-dimensional array module may comprise a third face. A state of the third face may encode a third pixel of the computer-readable code. The second three-dimensional module may also comprise a fourth face. The state of the fourth face may encode a fourth pixel of the second computer-readable code.

Some embodiments of the present disclosure can also be illustrated as a method of imprinting a computer-readable code. The method may comprise imprinting a first digit of a first computer-readable code on a first face of a first three-dimensional array module. The method may also comprise imprinting a second digit of the first computer-readable code on a second face of a second three-dimensional array module.

Some embodiments of the present disclosure can also be illustrated as a method of reading a first computer-readable code in a code array. The method may comprise scanning a state of a first face of a first three-dimensional array module. The method may also comprise identifying a content of a first digit of the first computer-readable code based on the scanning the state of the first face of the first three-dimensional array module. The method may also comprise scanning a state of a second face of a second three-dimensional array module. The method may also comprise identifying a content of a second digit of the first computer-readable code based on the scanning the state of the first face of the second three-dimensional array module.

DETAILED DESCRIPTION

Figure 1A:
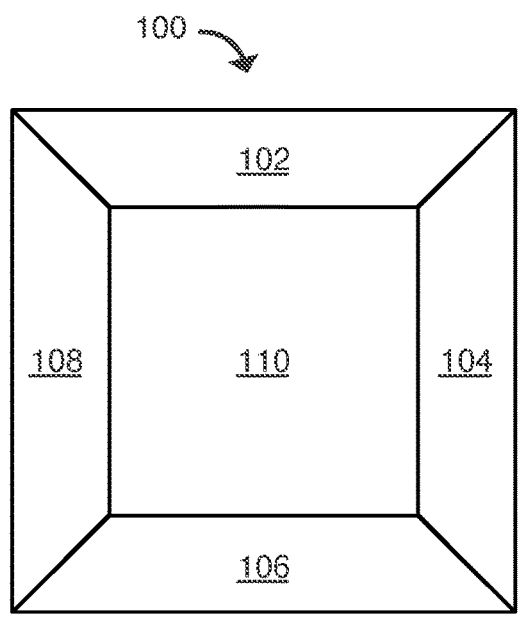
FIG. 1A illustrates a top view of an example truncated square-pyramid array module that could store information for up to five computer-readable codes in a code array in accordance with embodiments of the present disclosure.

Machine-readable encoding, such as 1-dimensional bar codes and 2-dimensional matrix codes, are used to record information in various fields for later retrieval by a computer. For example, a 1-dimensional bar code typically takes the form of a series of printed lines of various widths. The width of each bar can be read by a sensor, and a connected computer can translate those widths into a code that can, for example, identify a product to which the bar code is attached. On the other hand, a 2-dimensional matrix code (sometimes also referred to as a "bar code), typically takes the form of a 2-dimensional matrix of pixels that are either black or white. When a sensor reads a 2-dimensional matrix code, a computer may recognize a pre-determined pattern that identifies the encoding scheme and orientation of the matrix code. With that information, the computer can detect the pattern of the states of the pixels in the code (typically, which pixels are black and which pixels are white) and translate that pattern into useful information.

In typical encoding schemes, each coding pixel in a matrix code (i.e., each pixel that is not used to identify the coding scheme or to provide the code's physical orientation) represents one digit of a computer-readable code. The state of a particular coding pixel, therefore, encodes the content of a corresponding particular digit. Depending on the encoding scheme used by the matrix code, the "state" of a pixel in a code may vary. For example, in some encoding schemes, each digit is treated as a bit. In such encoding schemes, a digit may be "on" or "off" (also referred to as "true" and "false," "high" and "low," "0" and "1," etc.). For example, a pixel may be painted black for "1" and painted white for "0." In some encoding schemes, however, each digit may have more than two possible states. For example, a pixel may be etched with a first pattern for "1," etched with a second pattern for "2," and smooth for "3."

While bar codes and matrix codes are used in various applications, they are frequently used on physical products to identify information related to that product. For example, some codes can be used to identify the serial number of a product, which can then be used to determine pricing information for the product.

For some products, codes can be used in far more involved ways. In some industries, for example, multiple matrix codes may be affixed to a product to store information regarding various stages of the design and manufacturing of the product. In electronics products, for example, the services and components of several vendors may be included in a product throughout several stages of the products design, manufacture, and assembly. Typically, electronics products utilize a first vendor to design a printed circuit board (sometimes referred to herein as a "PCB") located within the product, another vendor to form the printed circuit board from separate layers of silicon and resin, and another vendor to attach, to the PCB, a variety of electrical components that may themselves be sourced from several different vendors.

In many electronics products, it can be important to allow more than one vendor to attach a matrix code to a surface inside the product housing (e.g., on the PCB) from which information regarding the services and components provided by that vendor can be identified at a later date.

For example, a vendor that forms the PCB of a product (a process known as "lamination") may attach a matrix code to the PCB from which a computer could determine when that particular PCB was laminated. This information could be useful, for example, a product manufacturer/seller determines that there are widespread and hazardous failures of that products. By analyzing the matrix codes of the failed products, the product manufacturer or laminator could determine that all product failures occur in products containing PCBs manufactured in the same calendar month. This may infer that a problem with the lamination process during that calendar month is causing the failures. With this information, the product manufacturer may be able to recall only the products whose PCBs were laminated in that month, rather than all products regardless of lamination date.

As another example, a vendor that provides a particularly important component of a product (for example, a microprocessor) may attach a matrix code on the PCB near that component. This matrix code could be used to store, for example, the results of the quality-control testing data that were performed on the component before being added to the product. This information may become useful if the product manufacturer ends up receiving a higher-than-expected amount of returns due to product failure. The product manufacturer could scan (or require the vendor to scan) those matrix codes to verify that the test results of the components in the returned products were within contractual requirements. This may enable the product manufacturer to hold the vendor responsible for excessive returns caused by the vendor delivering components that did not test within those contractual requirements.

In order for the matrix codes in the above examples to be useful, however, they must be large enough to be readable by a scanner. Further, some surfaces on or within a product may not be suitable for a matrix code. Many commercial products, for example, are designed with an aesthetic that only allows codes to be located on very small, obscured spaces. Further, some of the surface area of a PCB within a product may become covered with electrical components during product assembly. Placing a matrix code on those portions of the PCB surface area would not allow the code to be read after assembly. These factors can, in some instances, place significant limitations on where a matrix code can be placed and how small the matrix code can be imprinted (e.g., printed on a sticker) while still communicating the information desired by the vendor.

Unfortunately, these limitations can sometimes cause a product to not contain enough surface area for all desired vendor matrix codes to be effectively displayed. As a result, it may not be possible for the matrix codes of some vendors to be readable after a product is assembled. This places a limit on the amount of information that is available about a product after that product is assembled and sold. Without this information, a manufacturer may be unable to properly address issues that occur after assembly such as identifying the scope of or cause of safety hazards in a line of products.

In some industries, matrix codes can also be attached to a product after that product as been manufactured and used for some period of time. For example, some products require regular service (e.g., inspection or maintenance) in order to stay functional or pass safety regulations. In some industries, it is beneficial to attach a matrix-code sticker to the product to prove that the service has taken place and to provide the results of the service (e.g., inspection failure). However, providing a separate matrix code for each service instance can sometimes require more space than a product has available. Similarly, a periodic service may require multiple vendors (e.g., a materials safety inspector, an occupational safety inspector, and a maintenance worker) to provide a matrix code for each instance of service. In these examples, allowing each vendor to attach a separate bar code for each instance of service could be unfeasible.

For these reasons, a need exists for a matrix code that can combine information from multiple vendors and multiple occasions (e.g., multiple service instances, multiple stages in a manufacturing process), such as by combining multiple matrix codes into a single space.

Some embodiments of the present disclosure address some of the above issues by presenting a matrix-code array that combines multiple matrix codes into one space. Some embodiments of this array may differ from a standard matrix code in that, rather than containing an individual pixel at each point of a matrix code, each point in the array may include a physical structure that contains multiple pixels from multiple different matrix codes. These physical structures may sometimes be referred to herein as "array modules." In some embodiments, a code array of array modules could be built into the surface of a product (e.g., a printed circuit board) through laser etching. In some embodiments, a code array of array modules could be attached to the surface of the product with an adhesive.

In some embodiments, array modules may take the form of a recognizable geometric shape, such as a square pyramid or truncated square pyramid. These geometric shapes may be formed into an array with a repeatable pattern, which may increase the ability of a computer to scan the array for one or more matrix codes. Further, each side of these geometric shapes may represent one pixel of a matrix code. In some such embodiments, for example, the "left" side of every module of the array (or every module not reserved for identifying the orientation or coding scheme) may represent a pixel of a single code, and the "right" side of every module of the array may represent a pixel of a different code. Thus, by scanning one point of such an array, a computer could identify the pixels for multiple codes at once. By extension, therefore, by scanning every point in the array, a computer could read multiple matrix codes at one location of the product.

FIG. 1A illustrates a top view of an example array module 100 that could store information for up to five computer-readable codes in a code array. Array module 100 takes the form of a truncated square pyramid with four angled faces 102-108 and one top face 110. Array module 100 may be installed in a code array and may represent one pixel location in the code array. Each of faces 102-110 may represent a pixel for a different matrix code that is included in the code array. In other words, the state of face 102 may represent one pixel's worth of information for a first matrix code, the state of face 104 may represent one pixel's worth of information for a second matrix code, the state of face 106 may represent one pixel's worth of information for a third matrix code, the state of face 108 may represent one pixel's worth of information for a fourth matrix code, and the state of face 110 may represent one pixel's worth of information for a fifth matrix code.

In some coding schemes, for example, a pixel in a matrix code may represent a bit of information (i.e., a "1" or a "0"). In these coding schemes, a pixel in a first state represents an "off" bit. This is typically represented with a blank pixel that is the same color as the medium on which the matrix code is imprinted (e.g., a green pixel on a green background), but it could theoretically also be any other color or pattern that would be scannable by a computer. For example, a matrix code imprinted on a green background could use white pixels for "off" bits. Similarly, a pixel in a second state represents an "on" bit. This is typically represented with a pixel that is colored to be distinct from the color of the medium on which the matrix code is imprinted (e.g., a black pixel on a white background), but it could also be any other color or pattern that would be scannable by a computer.

Further, in some coding schemes, a pixel could be marked not by color, but by texture. For example, in some coding schemes, a pixel may be in a first state (e.g., an "off" bit) if that pixel exhibits a smooth texture, whereas a pixel may be in a second state if that pixel exhibits a rough (e.g., granular, ribbed) texture. For this reason, the changing of a pixel to a first or second state when applying a matrix code is sometimes referred to generally herein as "imprinting" that pixel or code. As used herein, "imprinting" a pixel or code could refer to changing the color of one or more pixels through a printing process or to changing the texture of one or more pixels (for example, through an etching process).

Thus, if face 110 were in a first state (e.g., painted white), array module 100 may encode a "0" for the fifth matrix code. Similarly, if face 102 were in a second state (e.g., painted black), array module 100 may also encode a "1" for the first matrix code.

Figure 1B:
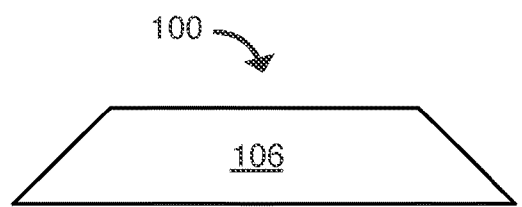
FIG. 1B illustrates a side view of the example array module.
Figure 1C:
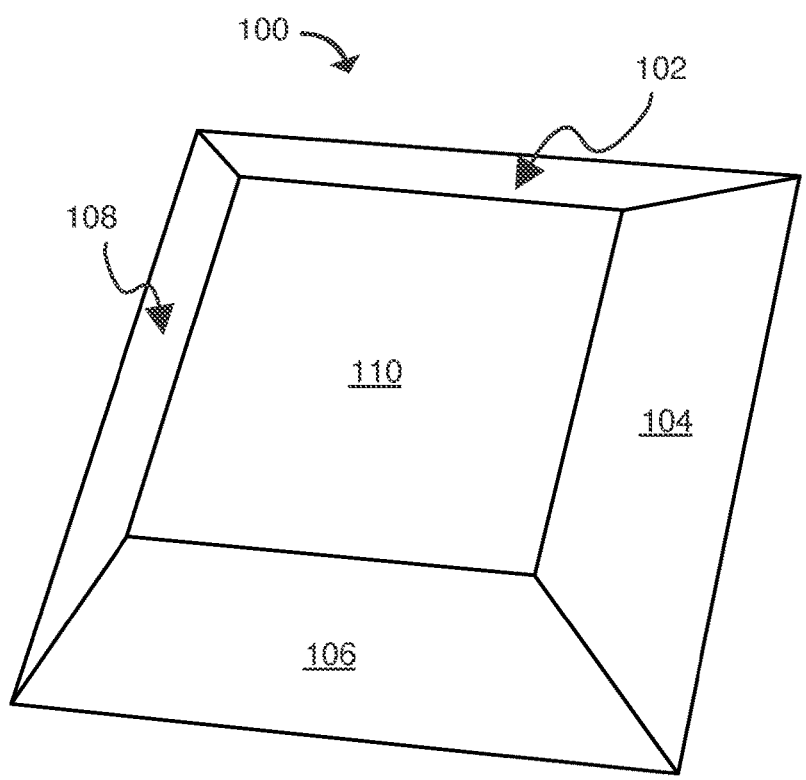
FIG. 1C illustrates a perspective view of the example array module.

FIGS. 1B and 1C illustrate the dimensionality of array module 100. FIG. 1B illustrates a side view of example array module 100 for the sake of understanding. In FIG. 1B, only face 106 is visible due to the 3-dimensional nature of array module 100. FIG. 1B also illustrates the depth of array module 100. Similarly, FIG. 1C illustrates a perspective view of array module 100. Like FIG. 1B, FIG. 1C illustrates the depth of array module 100. In FIG. 1C, all of faces 102-110 are visible.

Figure 2:
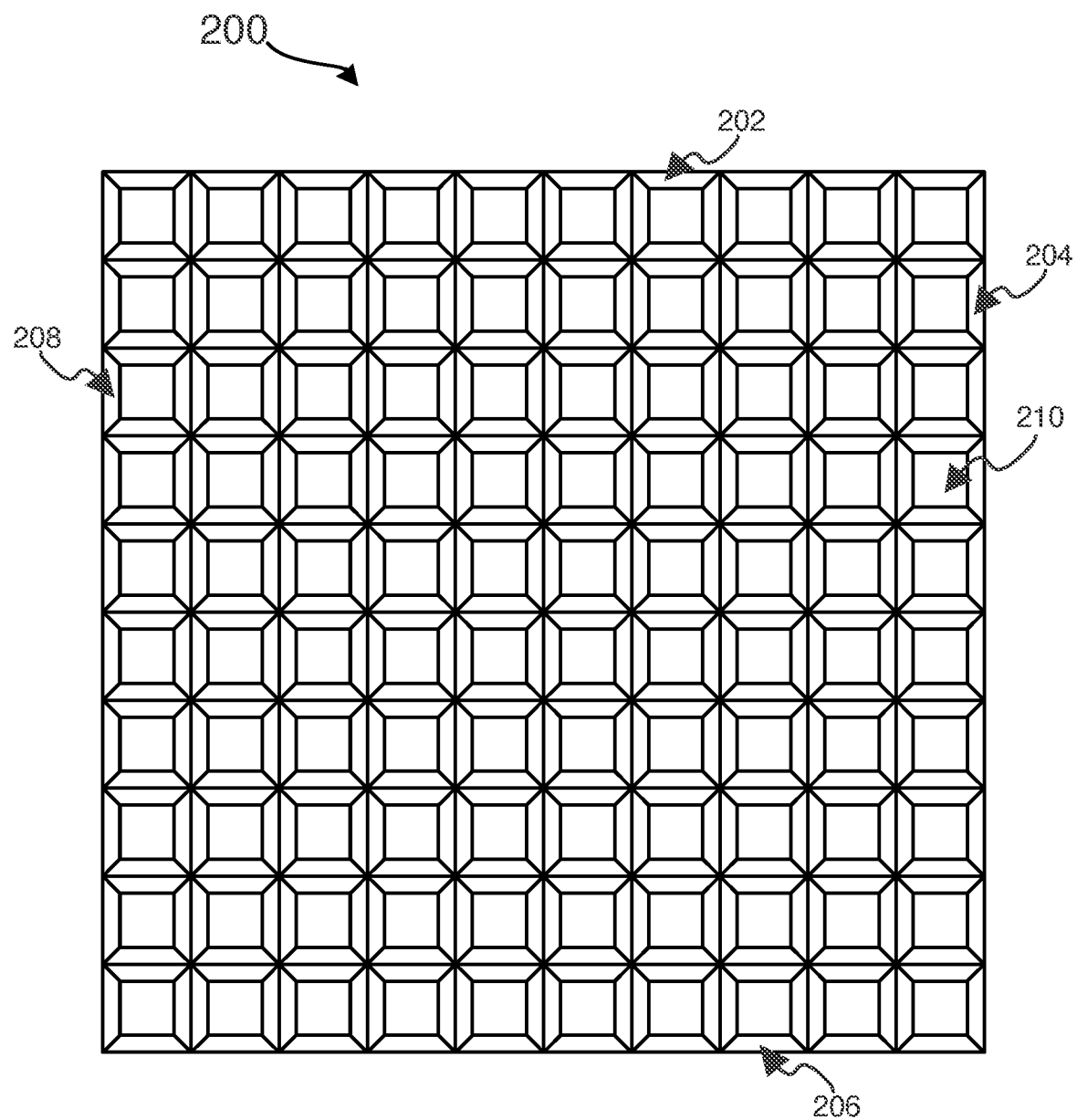
FIG. 2 illustrates an example code array composed of a set of array modules.

FIG. 2 illustrates an example code array 200 comprised of a set of array modules. As illustrated, each point in code array 200 is composed of an array module that, similar to array module 100, takes the form of a truncated square pyramid. Thus, each point in code array 200 features five faces, each of which could represent one pixel's worth of information for a separate matrix code. Specifically, code array 200 is composed of 10 rows and 10 columns of array modules, resulting in the ability to encode 100 pixels for each of five separate matrix codes.

In some implementations, each face of an array module in code array 200 may encode information for a bar code of a separate vendor. For example, code array 200 may be affixed to the PCB of an electronics product. The designer of the PCB may be assigned the top side face (e.g., face 202) of each array module, and the vendor that laminated the PCB may be assigned the right-side face (e.g., face 204) of each array module. The vendor that drilled vias in the PCB may be assigned the bottom-side face (e.g., face 206) of each array module, and the vendor that surface mounted the components to the PCB may be assigned the left-side face (e.g., face 208) of each array module. Finally, the supplier of a microprocessor incorporated into the product may be assigned the top face (e.g., face 210) of each array module.

In some implementations, each matrix code may be imprinted (e.g., printed or etched) onto a code array at the same time. This may be efficient, for example, if the first vendor to imprint a code onto the code array is informed of the codes that will be used by other vendors involved in the product into which a code array is being incorporated. However, in other implementations, some matrix codes in a code array may be imprinted onto the code array at separate times and by separate parties.

For example, the vendor that laminates a PCB may etch its code on the top face of the array modules in an array shortly after lamination by etching a texture onto the faces of the array modules (e.g., the left-side faces). However, the specifics of the product into which that particular PCB will be inserted may be uncertain at that point. For example, the PCB may be used in a low-performance product that utilizes an inexpensive processor or a high-performance product that uses a high-performance processor. In this example, the vendor that supplies the processors may provide a first code for products for which it provides a low-performance processor and a second code for products for which it provides a high-performance processor. In another example, the vendor that will perform soldering to attach components to the PCB may not be selected for that PCB, and thus the code provided by the soldering vendor may be completely unknown. In these and other examples, the capability of a code array to be shared by multiple vendors that can imprint their codes onto the array at separate times would be beneficial.

FIGS. 3A through 3D illustrate a code array 300 through the process of multiple vendors imprinting matrix codes to the array, potentially at separate times during the manufacturing and assembly of a product. In the interest of understanding, code array 300 is presented as a simplified array with only three rows and three columns of array modules.

Because the array modules illustrated in code array 300 take the form of truncated square pyramids, code array 300 could, in some embodiments, encode five different sets of matrix codes (i.e., one on each of the four side faces and one on the top face). As such, FIGS. 3A through 3D also exhibit code keys 302 through 310. Again, in the interest of understanding, code keys 302 through 310 show a visual representation of each code that has been imprinted onto the faces of code array 300. Code key 302, for example, represents the code imprinted upon the top faces (e.g., top face 312). Code key 304 represents the code imprinted upon the left-side faces (e.g., left-side face 314). Code key 306 represents the code imprinted upon the top-side faces (e.g., top-side face 316). Code key 308 represents the code imprinted upon the right-side faces (e.g., right-side face 318), and code key 310 represents the code imprinted upon the bottom-side faces (e.g., bottom-side face 320).

Figure 3A:
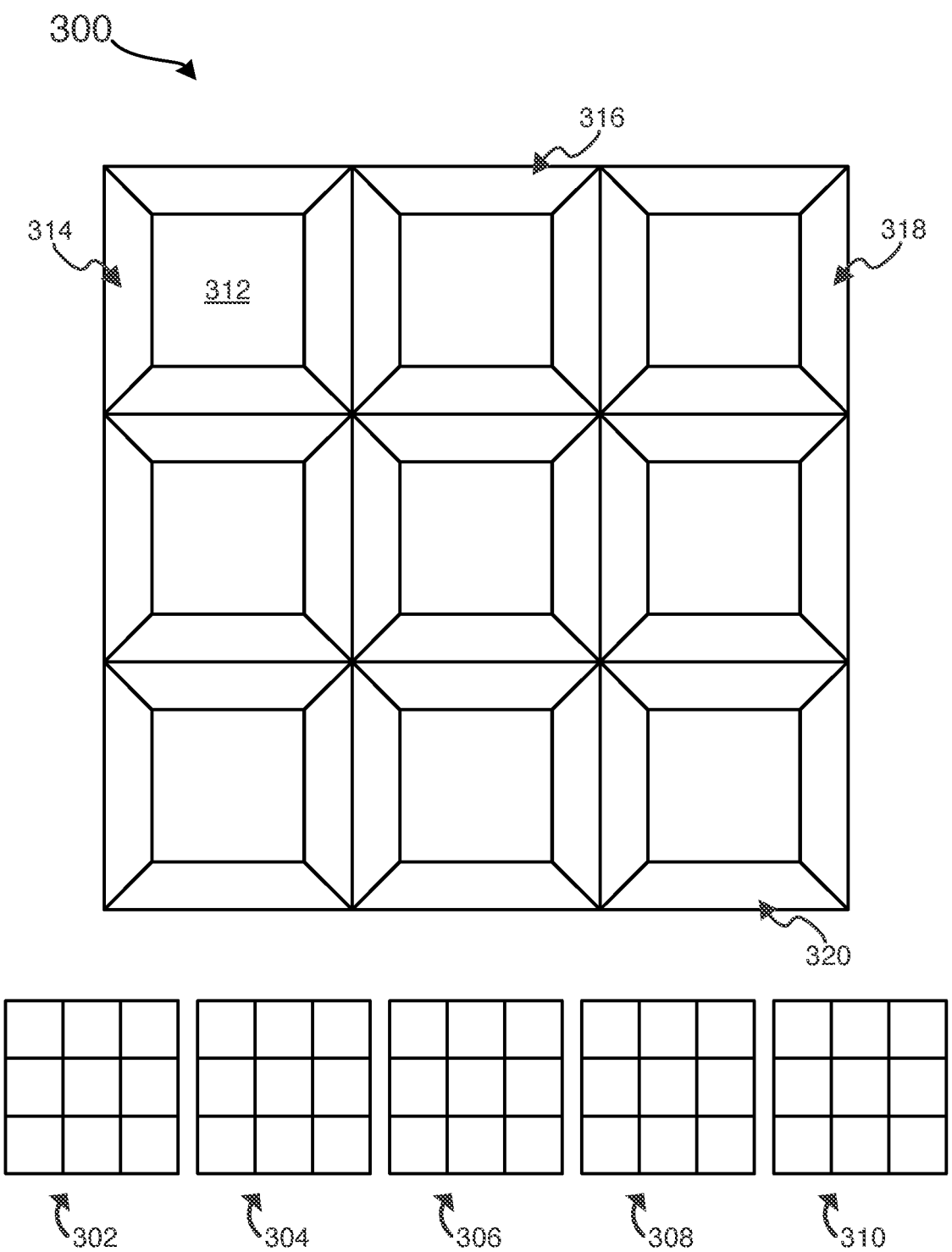
FIG. 3A illustrates a first view of an example code array before any codes are recorded onto the array, in accordance with embodiments of the present disclosure.

FIG. 3A illustrates a first view of code array 300 before any codes are imprinted onto the array. FIG. 3A may represent, for example, code array 300 before it is attached to a product, or before a first vendor has interacted with the product. For example, FIG. 3A may illustrate code array 300 after a PCB of an electronic product has been laminated but before code array 300 has been attached to the PCB. At this stage, the code from the vendor has not been imprinted upon code array 300. As such, all faces of all array modules in code array 300 are blank. Similarly, code keys 302 through 310 are correspondingly blank.

Figure 3B:
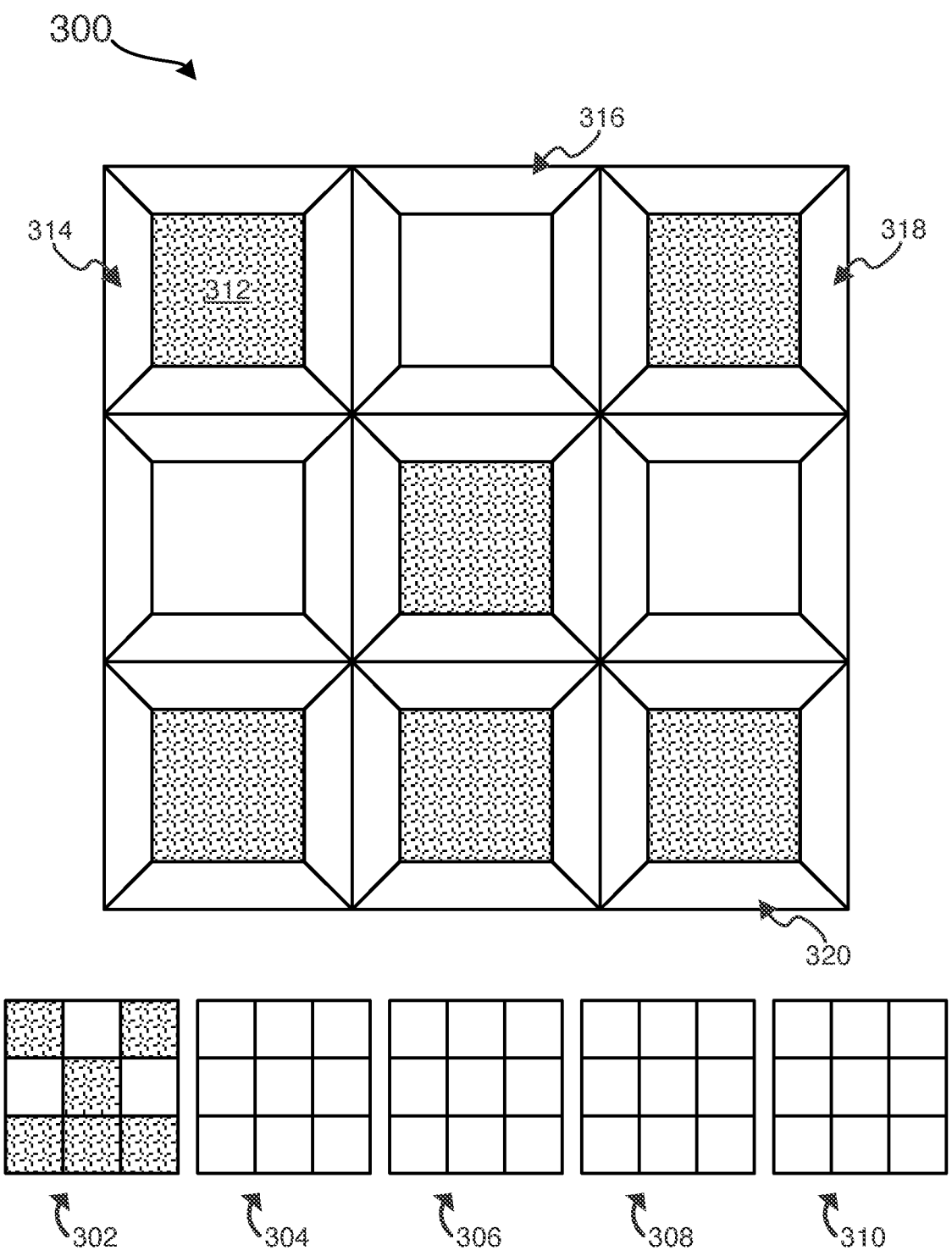
FIG. 3B illustrates a second view of the example code array after a first code is recorded onto the array, in accordance with embodiments of the present disclosure.

FIG. 3B illustrates a second view of the code array 300 after a first code is imprinted onto the array. Specifically, the first code has been imprinted onto the top faces of code array 300 (e.g., top face 312). The first code may have been imprinted, for example, by a printing process such as by an ink printer, a silkscreen printer, a dying process, a laser printer, or a heat-transfer printer. The first code may also have been imprinted with an etching process, such as by physically marring or grinding the top faces, chemically etching the top faces, cutting the top faces, or laser etching the top faces. Thus, the imprinting process may change the color on (or of) the faces of code array 300 or may change the physical structure of the faces of code array 300.

Code key 302 depicts a simplified pattern of the matrix code that has been imprinted on the top faces of code array 300. The specifics of the information encoded by this matrix code may vary by implementation. For example, if each shaded face represented a "1" and each white face represented a "0," the code imprinted in FIG. 3B may read, from top left to bottom right, "101 010 111." While code array 300 is a simplified example, a realistic example with a larger number of array modules may provide a long-enough code to encode a significant amount of information.

Figure 3C:
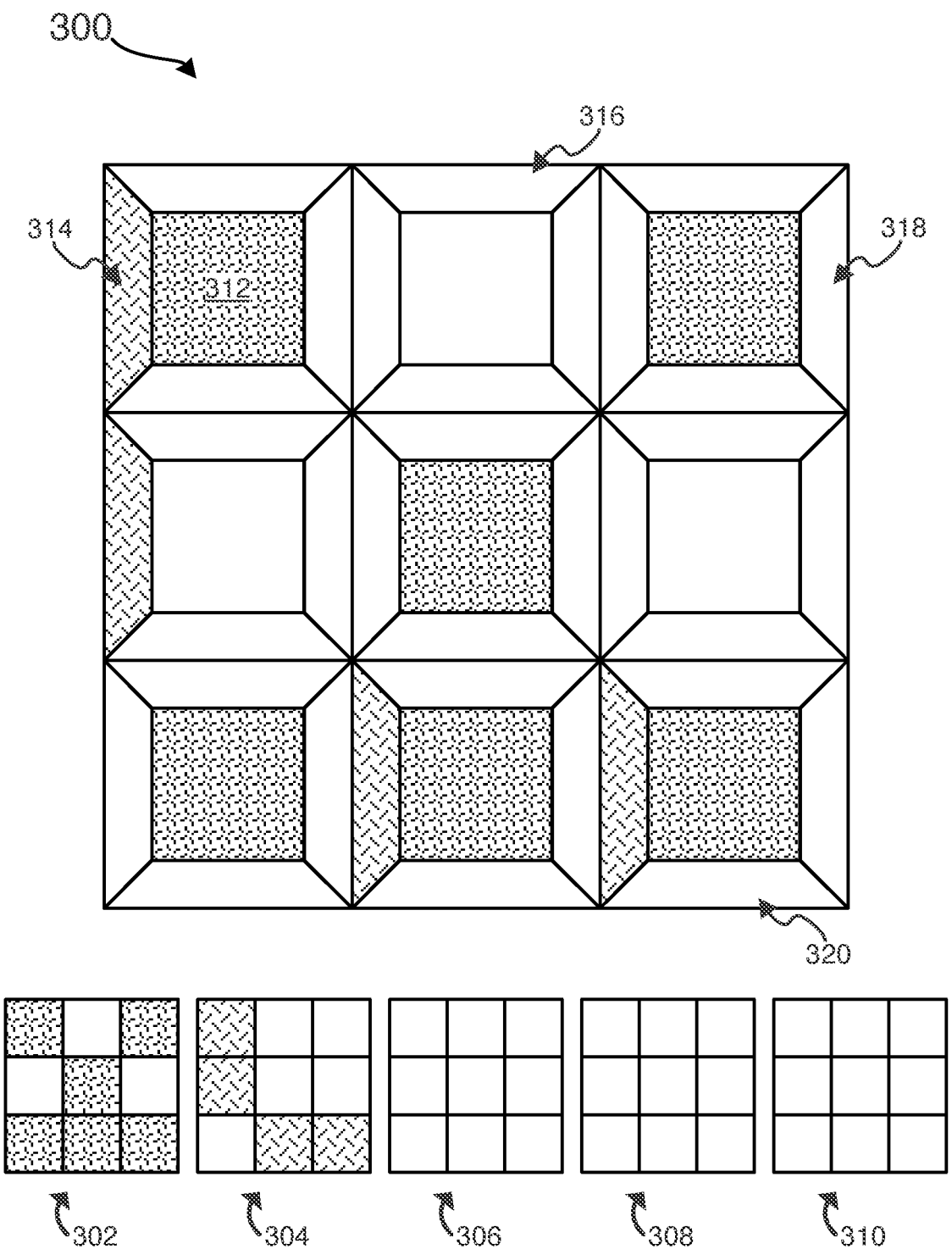
FIG. 3C illustrates a third view of the example code array after a second code is recorded onto the array, in accordance with embodiments of the present disclosure.

FIG. 3C illustrates a third view of code array 300 after a second code is recorded onto the array. Specifically, the second code has been imprinted onto the left-side faces of code array 300 (e.g., left-side face 314). The code in FIG. 3C may have been imprinted onto the left-side faces in the same or a similar method by which the code in FIG. 3B was imprinted onto the top faces. In other embodiments, however, a different imprinting process could be used. Of note, while the codes imprinted upon top faces (e.g., top face 312) and left-side faces (e.g., left-side face 312) have been represented with different patterns in FIGS. 3C and 3D, in some embodiments the same exact pattern/coloration could be used for multiple (or all) codes imprinted upon the faces of code-array 300. Similar to code key 302, code key 304 depicts a simplified pattern of the matrix code that has been imprinted onto the left-side faces of code array 300.

Figure 3D:
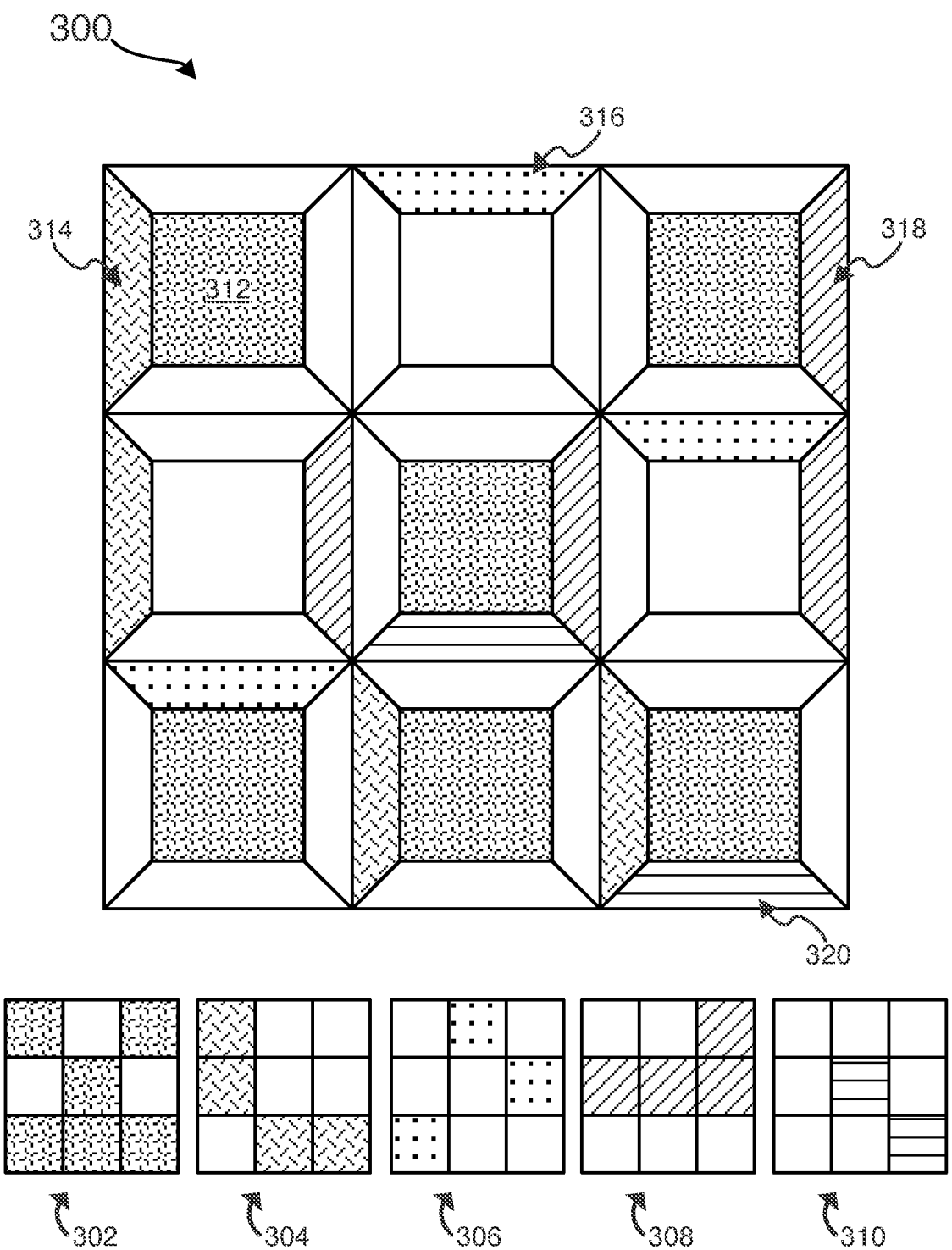
FIG. 3D illustrates a third view of the example code array after five codes are recorded onto the array, in accordance with embodiments of the present disclosure.

FIG. 3D illustrates a third view of code array 300 after five codes are recorded onto the array. As noted earlier, the code modules in code array 300 are presented as truncated square pyramids and could be encoded with five different matrix codes. Thus, FIG. 3D represents code array 300 after all codes have been imprinted onto the array. The first code (illustrated by code key 302) could have been imprinted by a PCB laminator. The second code (illustrated by code key 304) could have been imprinted by a router. The third code (illustrated by code key 306) could have been imprinted by a vendor or manufacturer after choosing the component configuration for the product. The fourth code (illustrated by code key 308) could have been imprinted by a vendor after performing reflow to attach those components to the PCB. Finally, the fifth code (illustrated by code key 310) could have been imprinted by a board tester after testing the connections and functions of the completed circuit board assembly.

As has been discussed, FIGS. 1A through 3D illustrate code arrays that make use of truncated square pyramids for array modules. Truncated square pyramids may be beneficial as array modules because they can be formed into a simple, repeating grid of array modules. Further, the resulting code array can be imprinted with five matrix codes.

However, in some implementations, a product may benefit from having more than or fewer than five matrix codes imprinted upon it. For this reason, some embodiments of the present disclosure can take the form of code arrays composed of array modules that have fewer than or more than five faces.

Figure 4:
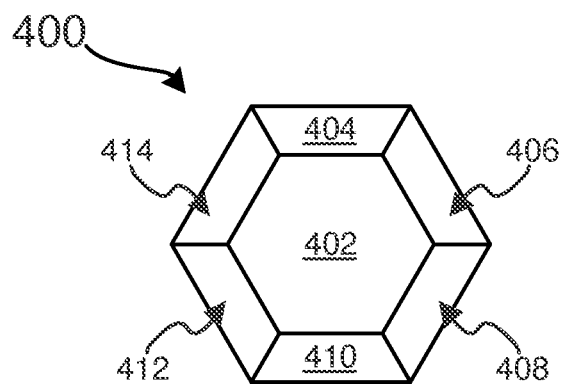
FIG. 4 illustrates a top view of an example truncated hexagonal-pyramid array module that could store information for up to seven computer-readable codes in a code array in accordance with embodiments of the present disclosure.

FIG. 4 illustrates a top view of array module 400 that could be imprinted with seven computer-readable codes. Array module 400 is a truncated hexagonal pyramid with a top face 402 and six side faces 404-414. For this reason, array module 400 may be useful in use cases in which it would be beneficial to imprint more than five matrix codes on a code array. For example, in some use cases more than five vendors may contribute to a product and may desire to encode information onto the product regarding that contribution. By forming a code array out of many copies of array module 400, seven vendors may be able to imprint their own codes on the product in one space.

Unlike an array module that takes the form of a truncated square pyramid, an array module that takes the form of a truncated hexagonal pyramid does not fit into a square grid. However, it is possible to form an array module of hexagonal pyramids using other grid patterns.

Figure 5:
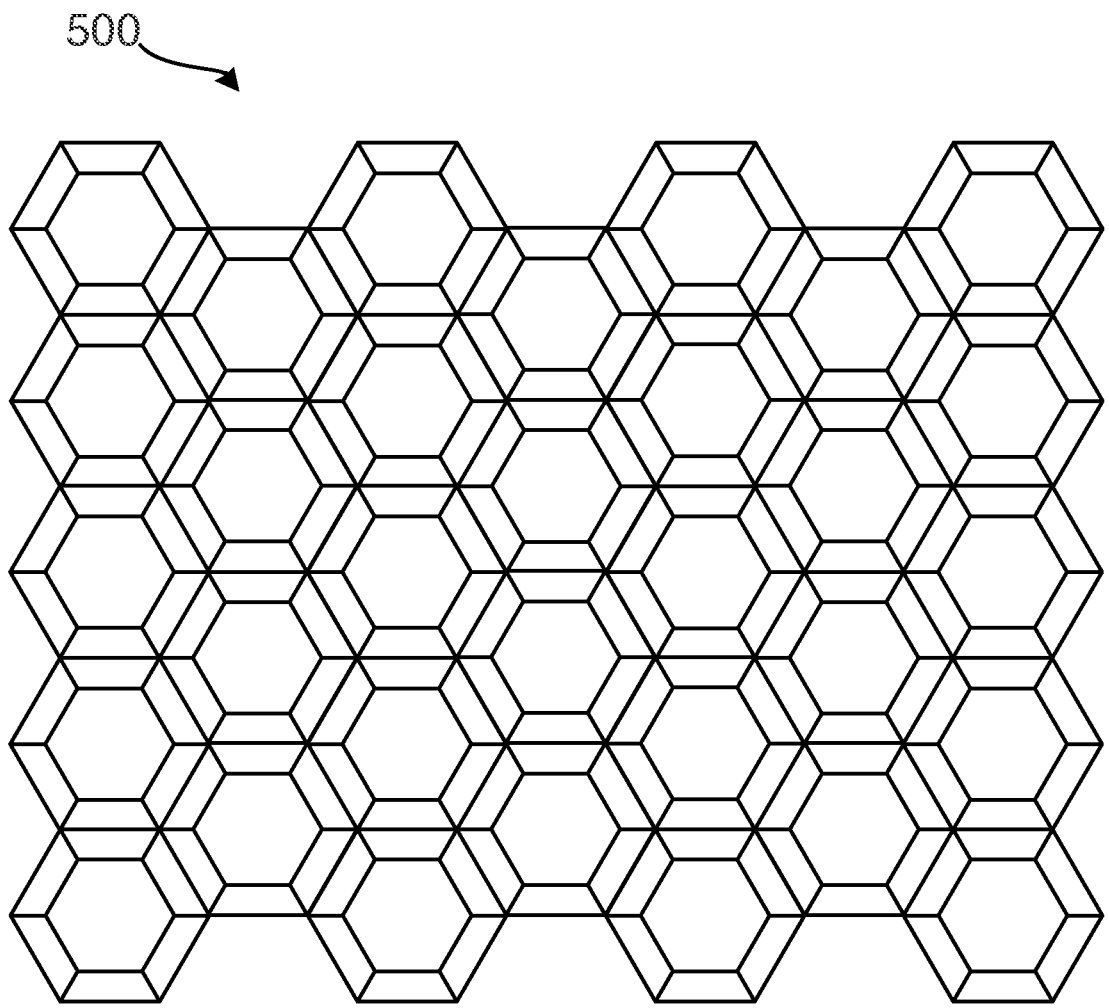
FIG. 5 illustrates an example code array composed of hexagonal pyramid array modules.

FIG. 5 illustrates example code array 500 composed of truncated hexagonal-pyramid array modules. The array modules in code array 500 are patterned into a hexagonal grid, also referred to as a hexagonal tessellation. In total, code array 500 includes 32 array modules. As such, code array 500 illustrates an example embodiment of combining seven 32-bit matrix codes into a single array, which may save significant space on a product on which code array 500 is included.

Figure 6:
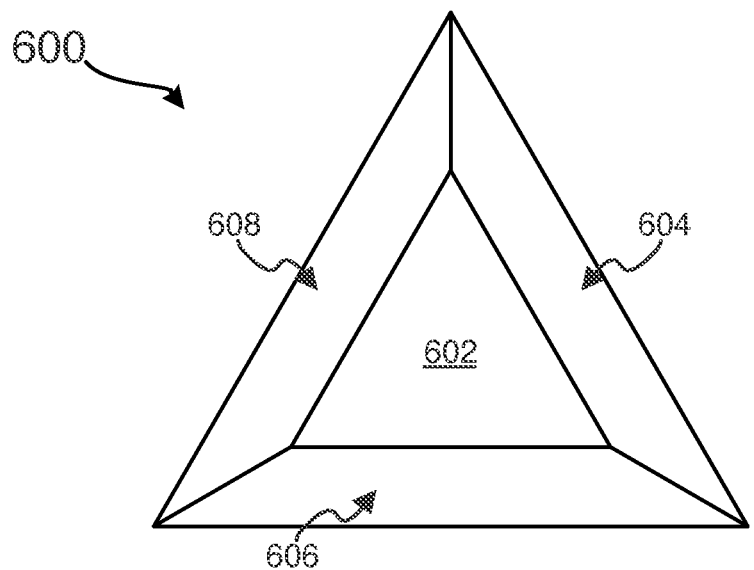
FIG. 6 illustrates a top view of an example truncated tetrahedral array module that could store information for up to four computer-readable codes in a code array in accordance with embodiments of the present disclosure.

FIG. 6 illustrates a top view of array module 600 that could be imprinted with four computer-readable codes. Array molecule 600 is a truncated tetrahedron with a top face 602 and three side faces 604-608. For this reason, array module 600 may be useful in use cases in which imprinting five or more matrix codes on a code array would be unnecessary. For example, in some use cases only four vendors may contribute to a product and may only require a single matrix code to encode information onto the product. In these use cases, a code array that can encode more than four matrix codes may take up more space on the product than is otherwise necessary.

Figure 7:
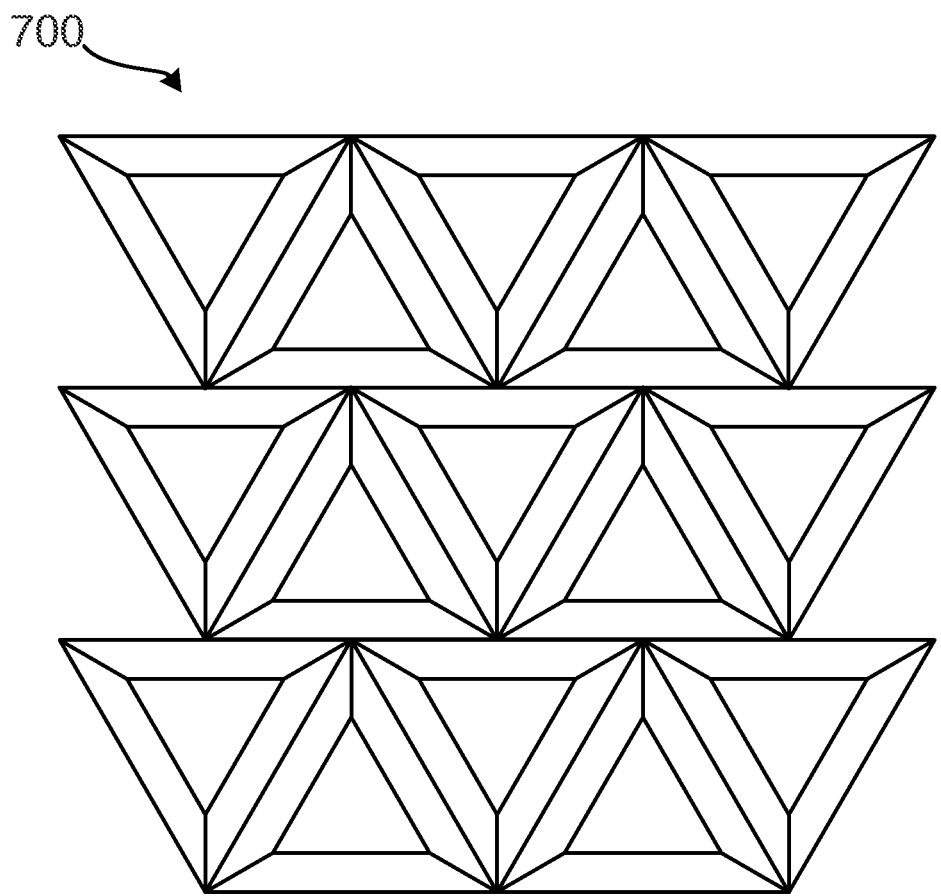
FIG. 7 illustrates an example code array composed of truncated tetrahedral array modules.

FIG. 7 illustrates example code 700 array composed of truncated tetrahedral array modules. The array molecules in code array 700 are patterned into a triangular grid, also referred to as a triangular tessellation. In total, code array 700 includes 15 array molecules. As such, code array 700 illustrates an example embodiment of combining four 32-bit codes into a single array. This may save significant space on a product in which code array 700 is included.

In some embodiments of the present disclosure, a large amount of matrix codes may be combined into a small space using a code array. As discussed, this may save space on a product that is dedicated to imprinting matrix codes. However, this increased code density may also make reading a particular matrix code more difficult in situations in which ideal visibility of the code array is not possible. For example, if an old camera/sensor or a camera/sensor with a dirty lens is being used to read a matrix code on a code array, the imprints on multiple faces of one or more array modules may be difficult to differentiate.

However, due to the three-dimensional nature of the array modules of some embodiments of the present disclosure, scanning a code array from different angles may enable a sensor to focus on different array-module faces. An example of this benefit can be illustrated by referring back to FIG. 3D. In FIG. 3D, code array 300 is composed of five matrix codes. Scanning code array 300 from the top (i.e., from the angle represented in FIG. 3D) may provide a clear image of the top faces of code array 300 (e.g., top face 312). Thus, scanning from the code array 300 from the top may enable a sensor to record the code represented by code key 302.

However, due to the density of matrix codes on code array 300, a poor-quality sensor may be unable to differentiate between the side faces the array modules when viewed from the top. However, by moving the sensor to a different location, certain side faces may be emphasized in the sensor's field of view. For example, by moving the sensor to the right of code array 300, the sensor may be positioned and angled in such a way that the right-side faces (e.g., right-side face 318) are emphasized. This may increase the ability of the sensor to record the code represented by code key 310.

Similarly, moving the sensor to other locations (for example, to the left), may increase the ability of the sensor to record other codes in the code array (for example, the code represented by code key 304). Further, this is not only true in code arrays composed of truncated square-pyramid array modules, but is also true in code arrays with array modules of other shapes (e.g., truncated tetrahedrons and truncated hexagonal pyramids).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-readable-code code array comprising:
   a first three-dimensional array module that comprises:
      a first face, wherein a state of the first face encodes a first pixel of a first computer-readable code; and
      a second face, wherein a state of the second face encodes a second pixel of a second computer-readable code; and
   a second three-dimensional array module that comprises:
      a third face, wherein a state of the third face encodes a third pixel of the first computer-readable code; and
      a fourth face, wherein a state of the fourth face encodes a fourth pixel of the second computer-readable code.

2. The computer-readable-code code array of claim 1, wherein the state of the first face is imprinted on the first face with a printing process.

3. The computer-readable-code code array of claim 1, wherein the state of the first face is imprinted on the first face with an etching process.

4. The computer-readable-code code array of claim 1, wherein the first three-dimensional array module is a truncated square pyramid.

5. The computer-readable-code code array of claim 1, wherein the first three-dimensional array module is a truncated hexagonal pyramid.

6. The computer-readable-code code array of claim 1, wherein the first three-dimensional array module is a truncated tetrahedron.

7. The computer-readable code array of claim 1, wherein the computer readable code array is etched into the surface of a product.

8. A method comprising:
   imprinting a first digit of a first computer-readable code on a first face of a first three-dimensional array module; and
   imprinting a second digit of the first computer-readable code on a second face of a second three-dimensional array module.

9. The method of claim 8, further comprising:
   imprinting a third digit of a second computer-readable code on a third face of the first three-dimensional array module;
   imprinting a fourth digit of the second computer-readable code on a fourth face of the second three-dimensional array module.

10. The method of claim 8, further comprising adding a code array onto a surface of a product, wherein the code array comprises the first three-dimensional array module and the second three-dimensional array module.

11. The method of claim 10, wherein the adding comprises etching the code array onto a surface of a printed circuit board.

12. The method of claim 10, wherein the adding comprises attaching the code array onto a surface of a product with an adhesive.

13. The method of claim 9, wherein the imprinting the first digit occurs after a first stage in a manufacturing process and the imprinting the third digit occurs after a second stage in a manufacturing process.

14. The method of claim 9, wherein the imprinting the first digit occurs after a first instance of periodic service and the imprinting the second digit occurs after a second instance of periodic service.

15. A method comprising:
   reading a first computer-readable code in a code array, the reading comprising:
      scanning a state of a first face of a first three-dimensional array module;
      identifying, based on the scanning the state of the first face of the first three-dimensional array module, a content of a first digit of the first computer-readable code;
      scanning a state of a first face of a second three-dimensional array module; and
      identifying, based on the scanning the state of the first face of the second three-dimensional array module, a content of a second digit of the first computer-readable code.

16. The method of claim 15, further comprising:
   reading a second computer-readable code in the code array, the reading the second computer-readable code comprising:
      scanning a state of a second face of the first three-dimensional array module;

identifying, based on the scanning the state of the second face of the first three-dimensional array module, a content of a first digit of the second computer-readable code;

scanning a state of a second face of the second three-dimensional array module; and identifying, based on the scanning the state of the second face of the second three-dimensional array module, a content of a second digit of the second computer-readable code.

17. The method of claim 16, wherein the scanning the state of the first face is performed at a first angle from the code array and the scanning the state of the second face is performed at a second angle from the code array.

* * * * *